United States Patent
Stihler et al.

(10) Patent No.: US 11,381,054 B2
(45) Date of Patent: Jul. 5, 2022

(54) AVOIDING MODE INSTABILITY IN AN OPTICAL AMPLIFIER FIBER

(71) Applicants: Fraunhofer-Gesellschaft zur Förderung der Angewandten Forschung E.V., Munich (DE); Friedrich-Schiller-Universität Jena, Jena (DE)

(72) Inventors: Christoph Stihler, Jena (DE); César Jáuregui Misas, Jena (DE); Jens Limpert, Jena (DE); Andreas Tünnermann, Weimar (DE)

(73) Assignees: Fraunhofer-Gesellschaft zur Förderung der angewandten Forschung e.V., Munich (DE); Friedrich-Schiller-Universität Jena, Jena (DE)

( * ) Notice: Subject to any disclaimer, the term of this patent is extended or adjusted under 35 U.S.C. 154(b) by 142 days.

(21) Appl. No.: 16/631,867

(22) PCT Filed: Jul. 17, 2018

(86) PCT No.: PCT/EP2018/069383
§ 371 (c)(1),
(2) Date: Jan. 17, 2020

(87) PCT Pub. No.: WO2019/016204
PCT Pub. Date: Jan. 24, 2019

(65) Prior Publication Data
US 2020/0153190 A1  May 14, 2020

(30) Foreign Application Priority Data

Jul. 17, 2017 (DE) .................. 10 2017 116 058.2
Sep. 14, 2017 (DE) .................. 10 2017 121 368.6

(51) Int. Cl.
*H01S 3/067* (2006.01)
*G02B 6/14* (2006.01)
(Continued)

(52) U.S. Cl.
CPC ............ *H01S 3/06754* (2013.01); *G02B 6/14* (2013.01); *G02B 6/34* (2013.01); *H04B 10/2543* (2013.01); *H04B 10/2581* (2013.01)

(58) Field of Classification Search
None
See application file for complete search history.

(56) References Cited

U.S. PATENT DOCUMENTS 8,199,178 B1 * 6/2012 Payne ................ B41J 2/465
347/239
2014/0043674 A1 2/2014 Takasaka et al.
(Continued)

FOREIGN PATENT DOCUMENTS

DE       102014014315    4/2016
WO       WO 2016/128058   8/2016
WO       WO 2019/016204   1/2019

OTHER PUBLICATIONS

Paschotta, "Explanation for the Mode Instability in High-power Fiber Amplifiers with Few-mode Fibers", Jun. 23, 2011, RP Photonics, The Photonics Spotlight, <https://www.rp-photonics.com/spotlight_2011_05_28.html>, 4 pages (Year: 2011).*
(Continued)

*Primary Examiner* — David W Lambert (57) ABSTRACT

The invention relates to a method for stably transmitting laser radiation through an optical waveguide (3), wherein two or more modes of the laser radiation propagating in the optical waveguide (3) interfere and form a mode interference pattern in the optical waveguide, as a result of which a thermally induced refractive index grating is produced in the optical waveguide (3). It is an object of the invention to (Continued)

demonstrate an effective approach for stabilizing the output signal of the optical waveguide (3) in a fiber-based laser/amplifier combination at high output powers, i.e. for avoiding mode instability. The invention achieves this object by virtue of the fact that a relative spatial phase shift between the mode interference pattern and the thermally induced refractive index grating is set in the direction of propagation of the laser radiation. In addition, the invention relates to a laser/amplifier combination comprising a laser (1) and an optical waveguide (3) in the form of an amplifier fiber, wherein the optical waveguide (3) amplifies the radiation of the laser (1) propagating therein. The invention proposes an actuating element (7), which produces a predefinable relative spatial phase shift of the mode interference pattern and of the thermally induced refractive index grating in the direction of propagation of the laser radiation.

14 Claims, 4 Drawing Sheets (51) Int. Cl.
G02B 6/34 (2006.01)
H04B 10/2543 (2013.01)
H04B 10/2581 (2013.01)

(56) References Cited

U.S. PATENT DOCUMENTS

| 2014/0050234 A1* | 2/2014 | Ter-Mikirtychev | H01S 3/0092 372/6 |
| 2015/0063767 A1* | 3/2015 | Jauregui | H01S 3/06737 385/122 |
| 2016/0226210 A1 | 8/2016 | Zayhowski et al. | |

OTHER PUBLICATIONS

Hansen et al., "Thermo-optical effects in high-power Ytterbium-doped fiber amplifiers", Nov. 21, 2011, Optics Express, vol. 19, No. 24, pp. 23965-23980 (Year: 2011).*

Otto et al., "Controlling mode instabilities by dynamic mode excitation with an acousto-optic deflector", Jul. 15, 2013, Optics Express, vol. 21, No. 14, pp. 17285-17298 (Year: 2013).*

Stihler et al., "Controlling mode instabilities at 628W average output power in an Ybdoped rod-type fiber amplifier by active modulation of the pump power", Feb. 22, 2017, SPIE LASE, 2017, San Francisco, California, United States, 6 pages (Year: 2017).*

Internationaler Recherchenbericht und Schriftlicher Bescheid [International Search Report and the Written Opinion] dated Oct. 17, 2018 From the International Searching Authority Re. Application No. PCT/EP2018/069383 and Its Translation of Search Report Into English. (12 Pages).

Pruefungsantrag [Request for Examination] dated Mar. 8, 2018 From the Deutsches Patent- und Markenamt [German Patent and Trademark Office] Re. Application No. 102017121368.6. (7 Pages).

Otto et al. "Controlling Mode Instabilities by Dynamic Mode Excitation With An Acousto-Optic Deflector", Optics Express, 21(14): 17285-17298, Published Online Jul. 12, 2013.

Rymann Hansen et al. "Thermo-Optical Effects in High-Power Ytterbium-Doped Fiber Amplifiers", Optics Express, XP055513778, 19(24): 23965-23980, Published Online Nov. 10, 2011.

Stihler et al. "Controlling Mode Instabilities at 628 W Average Output Power in An Yb-Doped Rod-Type Fiber Amplifier by Active Modulation of the Pump Power", Fiber Lasers XIV: Technology and Systems, Proceedings of the SPIE, 10083: 100830P-1-100830P-6, Feb. 22, 2017.

Tuennermann et al. "Frequency Resolved Analysis of Thermally Induced Refractive Index Changes in Fiber Amplifiers", Optics Letters, XP001578078, 37(17): 3597-3599, Published Online Aug. 24, 2012.

* cited by examiner

AVOIDING MODE INSTABILITY IN AN OPTICAL AMPLIFIER FIBER

RELATED APPLICATIONS

This application is a National Phase of PCT Patent Application No. PCT/EP2018/069383 having International filing date of Jul. 17, 2018, which claims the benefit of priority of German Patent Application Nos. 10 2017 116 058.2 filed on Jul. 17, 2017 and 10 2017 121 368.6 filed on Sep. 14, 2017. The contents of the above applications are all incorporated by reference as if fully set forth herein in their entirety.

FIELD AND BACKGROUND OF THE INVENTION

The invention relates to a method for stably transmitting laser radiation through an optical waveguide, wherein two or more modes of the laser radiation propagating in the optical waveguide interfere and form a mode interference pattern in the optical waveguide, as a result of which a thermally induced refractive index grating is produced in the optical waveguide.

In addition, the invention relates to a laser/amplifier combination comprising a laser and an amplifier fiber, wherein the amplifier fiber amplifies the radiation of the laser propagating therein, wherein two or more modes of the laser radiation propagating in the optical waveguide interfere and form a mode interference pattern in the optical waveguide, as a result of which a thermally induced refractive index grating is produced in the optical waveguide.

In the event of mode instability, a laser radiation propagating through the optical waveguide becomes unstable starting from a specific threshold of the power of the laser radiation, and energy is transferred from a fundamental mode to higher-order modes. Within the meaning of the invention, a "stable" transmission of laser radiation is accordingly present if no mode instability occurs.

The further development of fiber lasers recently has had the consequence that optical waveguides or optical fibers doped with rare earth ions as active medium yield a reliable concept as amplifiers for high-power lasers, for example. The development of low-power lasers into high-power lasers for industrial applications is based on the ability of optical waveguides to be able to handle high power. The very large ratio of surface area to active volume allows heat to be dissipated efficiently. This is an excellent prerequisite for high-power operation.

However, conditions in the optical waveguide lead to other problems. In this regard, by way of example, restricting the light signal to the core of the optical waveguide leads to high light intensity and to interactions between the material of the optical waveguide and the light signal. In particular, nonlinear effects that are difficult to control also arise in this case. The signal quality is thus greatly impaired.

Optical waveguides should accordingly be designed in such a way that nonlinear effects and interactions with the fiber material are reduced. The simplest and most effective way of reducing nonlinear effects is by increasing the diameter of the core. As a result, firstly, the intensity of the light in the core is reduced and, secondly, for example in the case of double-clad optical waveguides, the absorption of pump light can be increased. On account of the improved absorption of the pump light, the optical waveguide can be shortened and nonlinear effects can thus be reduced further.

With a large core diameter of the optical waveguide, however, it is difficult to implement single-mode operation or else operation with only a few modes, in particular in high-power operation. Additional measures have to be taken for this purpose, primarily under high thermal loading.

It has been found, however, that multimode operation can result in mode instability at high powers. In this case, the output signal of the optical waveguide or of a fiber laser realized therewith becomes unstable as soon as a power threshold is exceeded. Energy is transferred from a fundamental mode to higher-order modes. The beam profile of the radiation propagating in the optical waveguide, said beam profile e.g. originally being stably Gaussian, begins to vary and the beam profile fluctuates over time on account of the fundamental mode being superimposed with one or more higher-order modes in a manner variable over time. The temporal behavior of these fluctuations may be deterministic or else—depending on the power of the propagating radiation, random or chaotic.

This mode instability severely impairs the beam quality and thus the application of fiber laser concepts at very high powers (typically in the kW range).

The mode instability is considered to be caused by thermo-optical effects, namely temperature-induced local changes in the refractive index of the material of the optical waveguide, which are caused by mode interference, i.e. by interference of the different modes propagating in the optical waveguide (see Jauregui et al., Opt. Express 19, 2011, pages 3258 to 3271). Two or more (transverse) modes of the laser radiation propagating in the optical waveguide interfere with one another and in the process form a spatial mode interference pattern in the optical waveguide. The resultant spatial intensity distribution of the laser radiation thermally induces a refractive index grating in the optical waveguide. This in turn is responsible for the occurrence of energy transfer between the modes and thus for the mode instability that may be observed at high powers.

The prior art discloses various approaches for avoiding mode instability (see Jauregui et al., "Simplified modelling the mode instability threshold of high power fiber amplifiers in the presence of photodarkening,", Opt. Express 23, 20203, 2015; Smith et al., "Increasing mode instability thresholds of fiber amplifiers by gain saturation" , Opt. Express 21, 15168, 2013; Jauregui et al., "Passive mitigation strategies for mode instabilities in high-power fiber laser systems", Opt. Express 21, 19375, 2013; Eidam et al., "Preferential gain photonic-crystal fiber for mode stabilization at high average powers", Opt. Express 19, 3656, 2011; Otto et al. "Controlling mode instabilities by dynamic mode excitation with an acousto-optic deflector", Opt. Express 21, 17235, 2013; WO 2013/152862 A1).

It is an object of the invention to demonstrate a further, effective approach for stabilizing the output signal of the optical waveguide in a fiber-based laser/amplifier combination at high output powers, i.e. for avoiding mode instability.

The invention achieves the object proceeding from a method of the type specified in the introduction by virtue of the fact that a relative spatial phase shift between the mode interference pattern and the thermally induced refractive index grating is set in the direction of propagation of the laser radiation.

The invention is based on the insight that the energy transfer between the laser radiation modes propagating in the optical waveguide is dependent on the (spatial) phase relationship between the mode interference pattern and the thermally induced refractive index grating. According to the invention, the relative phase shift is ideally set such that it is constant over time. This makes it possible to ensure that mode instability does not occur at any point in time, i.e. that the energy transfer takes place only in one direction (e.g. to the fundamental mode), i.e. the laser radiation e.g. at the output of a fiber laser has a power that is constant over time and a beam profile that is constant over time.

In one possible configuration of the method according to the invention, the laser radiation is coupled into the optical waveguide in burst operation, wherein the repetition frequency of the radiation bursts is 50 Hz to 30 kHz, preferably 200 Hz to 10 kHz. Burst operation means that the laser radiation is coupled into the optical waveguide intermittently over time, e.g. by virtue of the fact that a laser that generates the laser radiation coupled into the optical waveguide is periodically switched on and off or its radiation is modulated over time in some other way. While the laser radiation is switched on, the optical waveguide heats up. The phase relationship between the mode interference pattern and the thermally induced refractive index grating changes in this case. If the laser radiation is switched off again, the waveguide cools down and the phase relationship, after a certain time, reverts to the original state. The laser radiation can be switched on and off in a targeted manner, i.e. the timing of the bursts can be chosen in a targeted manner, in such a way that in this case the phase shift always remains outside a range in which the undesired energy transfer from the fundamental mode to higher-order modes takes place.

Alternatively, the relative spatial phase shift can be set by virtue of the fact that the mode interference pattern of the laser radiation travels only in a direction along the optical waveguide. When the mode interference pattern moves along the optical waveguide, the thermally induced refractive index grating correspondingly follows this movement. The velocity of this movement is determined by the thermal properties of the optical waveguide. Given suitable setting of the parameters, i.e. of the velocity of the movement of the mode interference pattern through the optical waveguide, what can be achieved is that the relative spatial phase shift between the travelling mode interference pattern and the following thermally induced refractive index grating remains constant over time, specifically e.g. in a range in which energy transfer takes place only to the fundamental mode. As necessary, the energy transfer direction can also be set such that only energy transfer to higher-order modes takes place. The radiation at the output of the optical waveguide can thus be switched between different modes as desired.

The travelling mode interference pattern can be produced e.g. by virtue of the fact that the laser radiation coupled into the optical waveguide excites at least two transverse modes of the optical waveguide which differ from one another with regard to their central frequency. In this case, the difference in the central frequencies of the at least two modes should be not more than 50 kHz.

Alternatively, the travelling mode interference pattern can also be produced by virtue of the fact that the laser radiation coupled into the optical waveguide has an intensity and phase profile that is variable over time in the beam cross-section. For this purpose, it is possible to use e.g. a digital micromirror ("digital micromirror device"—DMD) or a so-called "photonic lantern", as a result of which the radiation of a laser is modified before it is coupled into the optical waveguide.

Preferably, the optical waveguide is optically pumped, as a result of which the laser radiation is amplified during propagation through the optical waveguide. For this purpose, the optical waveguide can be doped e.g. with rare earth ions. Alternatively, the laser radiation propagating in the optical waveguide can be amplified by inelastic scattering effects, such as Raman or Brillouin scattering. It is likewise conceivable for the laser radiation propagating in the optical waveguide to be amplified by an optical parametric process.

Thus, a laser/amplifier combination based on the approach according to the invention can be realized, comprising a laser and an amplifier fiber as optical waveguide, wherein the optical waveguide amplifies the radiation of the laser propagating therein, wherein two or more modes of the laser radiation propagating in the optical waveguide interfere and form a mode interference pattern in the optical waveguide, as a result of which a thermally induced refractive index grating is produced in the optical waveguide. According to the invention, provision is made of an actuating element, which produces a predefinable relative spatial phase shift of the mode interference pattern and of the thermally induced refractive index grating in the direction of propagation of the laser radiation, in order to suppress mode instability in this way.

The problems associated with mode instability occur, as explained above, at particularly high powers of the amplified laser radiation. This concerns in particular the power range above an average power of 100 W. The invention makes it possible to realize laser/amplifier combinations in which the average power of the amplified laser radiation is 100 W, 1 kW, 10 kW or even more, without mode instability occurring.

Further features, details and advantages of the invention are evident from the wording of the claims and also from the following description of exemplary embodiments with reference to the figures, in which:

Figure 1:
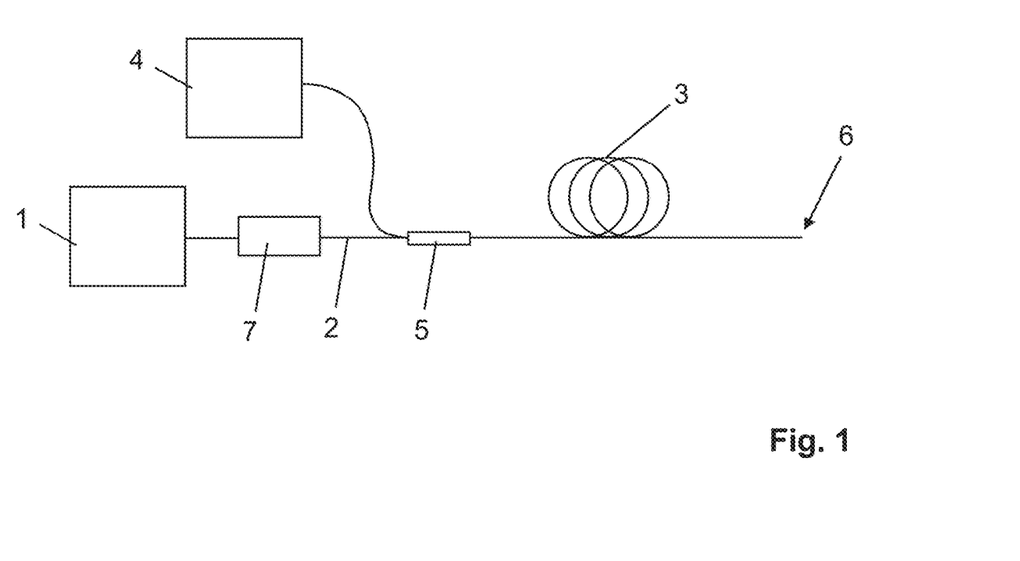
FIG. 1 shows a schematic view of a laser/amplifier combination according to the invention as a block diagram.

The laser/amplifier combination shown in FIG. 1 comprises a laser 1, preferably in the form of a fiber laser, which generates laser radiation at low intensity and outputs it via a coupling to an optical fiber 2. The laser 1 can be a continuous wave laser or else a pulsed layer. The radiation generated by the laser 1 propagates—optionally after passing through one or more preamplifier stages (not illustrated)—in an amplifier fiber 3 (the terms optical waveguide and optical fiber, amplifier fiber or simply fiber are used synonymously hereinafter) and is amplified to the desired power therein. For this purpose, the core of the amplifier fiber 3, said core guiding the laser radiation, is doped with rare earth ions. The amplifier fiber 3 is optically pumped by means of a pump light source 4. The light from the pump light source 4 is coupled via a coupler 5 into the amplifier fiber 3 in a manner known per se. The pump light then propagates together with the laser radiation to be amplified in the amplifier fiber 3. The average power of the laser radiation at the output 6 of the amplifier fiber is more than 100 kW, optionally even 10 kW or more. Two or more modes of the laser radiation propagating in the amplifier fiber 3 interfere and form a mode interference pattern in the amplifier fiber 3, as a result of which a thermally induced refractive index grating is produced in said fiber. In order to avoid mode instability, an actuating element 7 is disposed upstream of the amplifier fiber 3 and produces a predefinable relative spatial phase shift between the mode interference pattern and the thermally induced refractive index grating in the direction of propagation of the laser radiation in the amplifier fiber 3.

The basic principle for avoiding mode instability according to the invention is explained in greater detail below.

Figure 2:
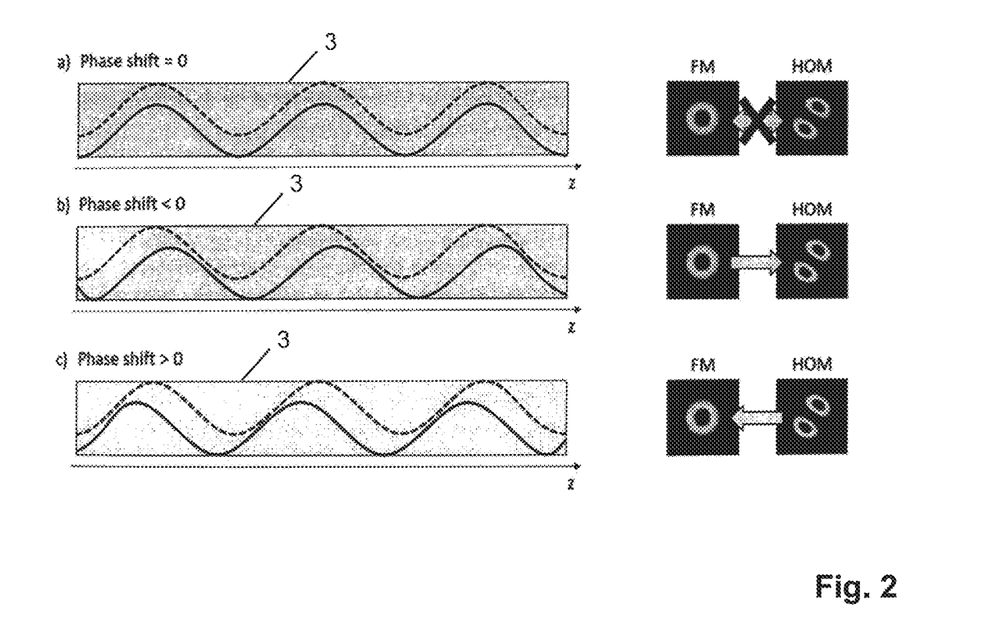
FIG. 2 schematically shows the influence of the phase shift between the mode interference pattern and the thermally induced refractive index grating on the energy transfer between the modes of an optical waveguide.

If two (transverse) modes are excited simultaneously in an optical fiber, they propagate therein to form a three-dimensional mode interference pattern. The latter in turn generates a thermal loading of the fiber, the spatial distribution of which imitates the mode interference pattern. This results in a spatially quasi-periodic temperature profile in the fiber, which, by way of the thermo-optical effect, is finally translated into a correspondingly quasi-periodic refractive index change, i.e. a refractive index grating. Such a grating is suitable with regard to symmetry and periodicity for transferring energy between the laser radiation modes propagating in the fiber, which ultimately leads to undesired mode instability. In order that this energy exchange can actually take place, an additional condition has to be met, however: there must be a phase shift between the mode interference pattern and the thermally induced refractive index grating. In this case, the value and the sign of this phase shift determine the extent and the direction of the energy transfer, as illustrated schematically in FIG. 2. In the diagrams the dashed curve in each case represents the thermally induced refractive index grating and the solid curve represents the mode interference pattern in the optical fiber 3. If, as shown in the diagram in FIG. 2a, the thermally induced refractive index grating and the mode interference pattern are completely in phase, i.e. the phase shift is equal to zero, then an energy exchange between the modes is not possible, irrespective of the constitution and manifestation of the refractive index grating. If, by contrast, as shown in FIG. 2b, the maxima of the mode interference pattern are delayed (shifted in the direction of propagation of the laser radiation) in relation to those of the thermally induced refractive index grating, i.e. a negative phase shift is present, energy is transferred from the fundamental mode (FM) in the direction of higher modes (HOM). If the maxima of the mode interference pattern are leading (are shifted relative to the refractive index grating counter to the direction of propagation of the laser radiation), i.e. a positive phase shift is present, the energy is transferred from the HOM to the FM.

One possibility for avoiding mode instability would thus be to ensure that the phase shift is always exactly equal to zero. This is virtually impossible to implement in practice, however, since at higher power the manifestation of the thermally induced refractive index grating increases and even small fluctuations of the phase shift result in a significant energy transfer. A more effective possibility for suppressing mode instability is to force the energy transfer in the direction of the FM (i.e. according to the situation in FIG. 2c). In this way, irrespective of the mode characteristics of the fiber, a single-mode (fundamental-mode) beam is obtained at the output of the fiber, said beam having a high beam quality, i.e. without mode instability. This corresponds to the approach of the invention: setting the phase shift between the mode interference pattern and the thermally induced refractive index grating so as to force the energy transfer in the direction of the desired mode of the fiber (typically the FM). The methods presented below are suitable, for example, for practical implementation of this approach.

Figure 3:
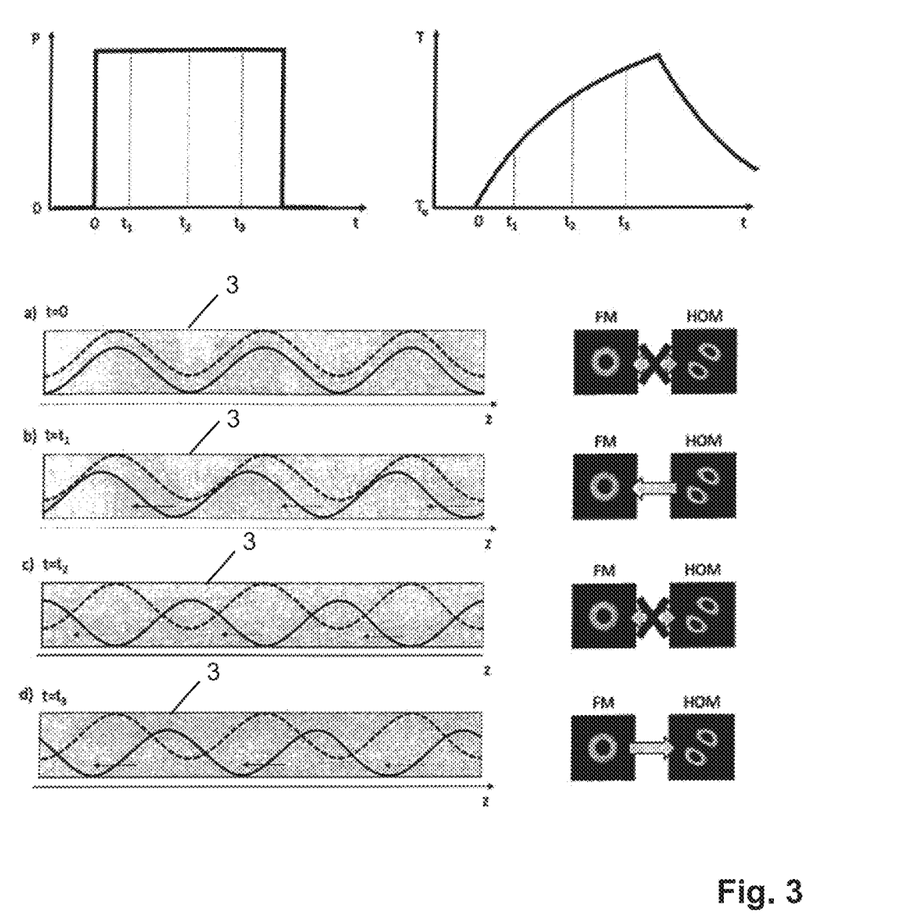
FIG. 3 schematically shows the effect of burst operation according to the invention for setting the phase shift between the mode interference pattern and the thermally induced refractive index grating.

As mentioned above, one possibility for producing a desired (in particular positive) phase shift between mode interference pattern and refractive index grating is to couple the laser radiation into the optical waveguide 3 in burst operation. This is illustrated in FIG. 3. The top left diagram in FIG. 3 shows the time profile of the power of the laser radiation coupled into the optical waveguide 3. The radiation burst begins at t=0. The radiation bursts typically have a duration of a few hundred microseconds. For illustration purposes, it is assumed that the mode interference pattern and the thermally induced refractive index grating are in phase before the beginning of a burst (FIG. 3a). If the repetition frequency of the radiation bursts is in a suitable range (typically 50 Hz to 30 kHz), then the temperature profile over time as shown in the top right diagram in FIG. 3 arises in the fiber 3. At t=0, the average temperature in the fiber begins to rise. This leads to a spatial compression of the mode interference pattern, which in turn results in a positive relative phase shift with respect to the thermally induced refractive index grating (FIG. 3b). This corresponds to the situation in which the energy is transferred in the direction of the FM of the fiber, as described above with regard to FIG. 2c. This situation of "beam cleaning" is maintained over a certain time period, typically of the order of magnitude of a few hundred microseconds depending on the respective fiber and the output power. During this time, the average temperature in the fiber increases further and the phase shift accordingly becomes greater and greater. This takes place until a certain point in time (t=$t_2$ in FIG. 3) at which the mode interference pattern has been shifted by half a period length and the modal energy transfer stops (FIG. 3c). The temperature then rises still further and the phase shift also becomes greater, with the result that the modal energy transfer is reversed (since the phase shift effectively becomes negative) and the energy flows to the HOM starting from point in time t=$t_3$ (FIG. 3d). After the end of the burst, the fiber 3 cools down and the average temperature falls. According to the invention, it should be ensured that the burst is kept so short (shorter than $t_2$) that only beam cleaning takes place, i.e. the phase shift remains positive in order that the situation in FIG. 3d is not reached. That works because the average temperature in the fiber 3 can change more rapidly than the rising transverse temperature inhomogeneities that induce the refractive index grating. Therefore, in burst operation there is a specific time window of duration $t_2$ (depending on the respective fiber and on the output power) in which the energy for the most part is contained in the FM of the fiber 3. This enables operation with diffraction-limited beam quality significantly above the threshold from which normally, i.e. without the measures according to the invention, mode instability commences. Since the duration of the burst is limited to $t_2$, the only possibility for increasing the average power emitted by the laser is to increase the repetition rate. The latter is likewise limited, however, since the time between successive bursts must not become too short. Otherwise, a significant thermal crosstalk process occurs and the initial phase shift does not return to zero. This state should be reached, however, since the burst duration can thus become maximal. The time interval between the bursts must likewise not become too long because then the thermally induced refractive index grating completely disappears. This state is not desired according to the invention.

Figure 4:
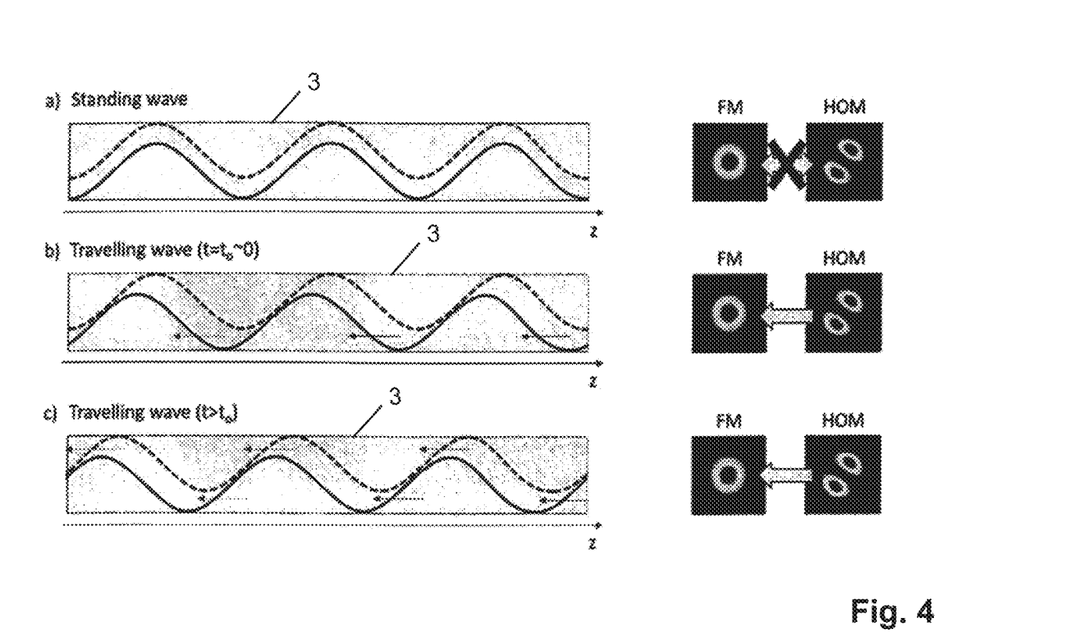
FIG. 4 shows the effect of a travelling mode interference pattern in the optical waveguide.

A further embodiment of the invention provides for the relative spatial phase shift to be set by virtue of the fact that the mode interference pattern of the laser radiation travels along the direction of propagation in the fiber 3. This principle is explained below with reference to FIG. 4. In the case of a standing mode interference pattern, the relative phase shift is equal to zero, and energy transfer between the modes does not take place. This is shown in FIG. 4a. If the mode interference pattern begins to move at a constant velocity (FIG. 4b), a specific phase shift is established until the thermally induced refractive index grating begins to follow the movement of the mode interference pattern (in a delayed manner) at the same velocity. This results in a phase shift that is stable over time and hence a constant energy flow between the fiber modes (FIG. 4c). The absolute value of the phase shift can be controlled by the velocity of the movement of the mode interference pattern. The sign of the phase shift and thus the direction of the energy transfer can be determined by the direction of movement. This makes it possible to switch between the different modes (FM, HOM) at the output of the fiber 3. The velocity of the movement of the mode interference pattern controls the phase shift, as mentioned above. If this movement velocity is too low, the resulting phase shift is almost zero, and only a weak energy transfer between the fiber modes will take place. If the velocity is increased, the transfer becomes stronger, and a stable phase shift develops between the thermally induced refractive index grating and the modal interference intensity pattern, as described above. This is possible up to an upper limit of the movement velocity. From this velocity on the refractive index profile is no longer able to follow the mode interference pattern. That means that a stable phase shift is not established.

Figure 5:
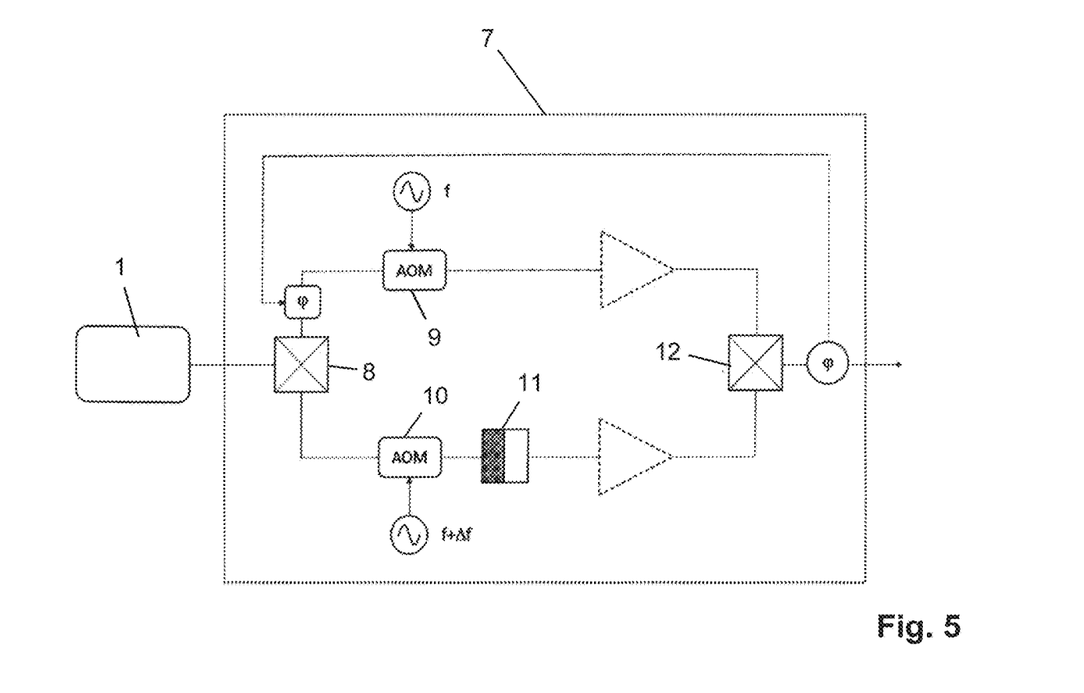
FIG. 5 shows a laser/amplifier combination according to the invention with a detailed illustration of the actuating element for setting the phase shift between the mode interference pattern and the thermally induced refractive index grating as a block diagram.

A description is given below of two exemplary possibilities for producing a mode interference pattern that travels in the fiber 3 by means of an actuating element 7 according to the invention. The exemplary embodiment explained with reference to FIG. 5 is based on the temporally modulated interference of two laser beams that are coupled into the fiber 3. The exemplary embodiment in FIG. 6 uses direct beam shaping before coupling-in.

A travelling mode interference pattern forms in the fiber 3 if the FM and the HOM of the laser radiation propagating in the fiber 3 have slightly different central frequencies. In this case, the absolute value of the frequency difference between the modes predefines the velocity of the travelling mode interference pattern and the sign predefines the direction of movement. The difficulty with this approach consists in exciting two modes at slightly different frequencies when the laser radiation is coupled into the fiber 3.

The actuating element 7 illustrated in FIG. 5 proceeds from the radiation of the laser 1, which supplies a laser beam corresponding to the FM at the output. Said beam impinges on a beam splitter 8 and is split between two beam branches. In each of the spatially separated branches, a frequency shift takes place by means of acousto-optical modulators (AOMs) 9, 10. The two AOMs 9, 10 are driven with slightly different frequencies (f and f+Δf). Situated in one of the beam paths is a mode converter 11, e.g. a phase plate, which shapes the incoming Gaussian beam into a beam having a profile which comes close to an HOM of the fiber 3 (not illustrated in FIG. 5). A certain amplification of the beams can optionally be carried out in the two branches before the two beams are superimposed again in a further beam splitter 12 and are then coupled into the fiber 3. Since the beam intensity and the phase profiles arriving via the two branches are different and are modulated with slightly different frequencies, the result of the superimposition is a beam profile that is variable over time. This is exactly what is required to create a movable mode interference pattern in the fiber 3. The exemplary embodiment illustrated in FIG. 5 additionally comprises a phase locked loop for the purpose of active stabilization.

Figure 6:
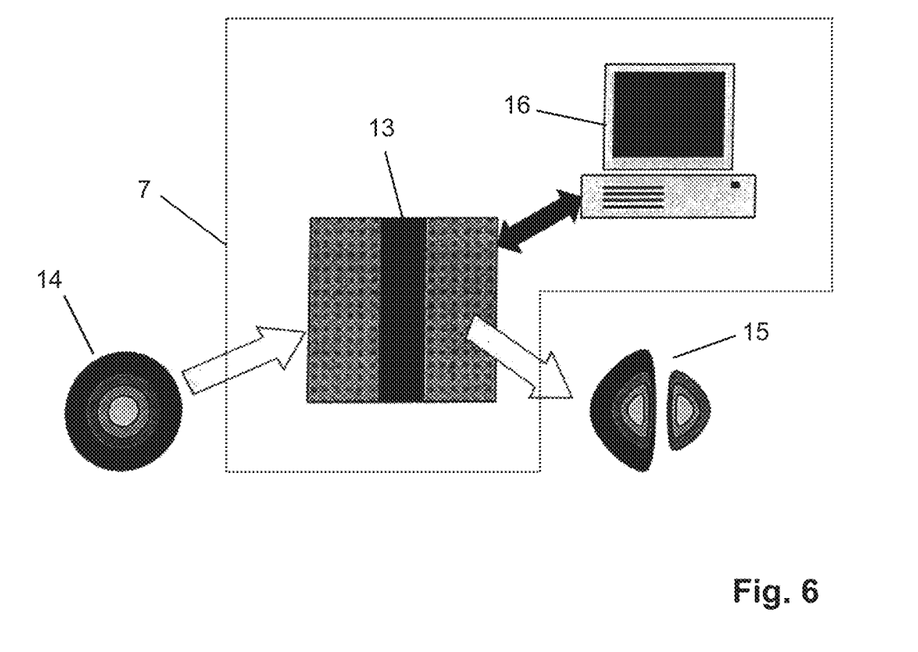
FIG. 6 schematically shows a seed laser system for producing a travelling mode interference pattern in the waveguide.

An alternative approach for producing a travelling mode interference pattern involves reproducing at the input of the fiber 3 directly the correspondingly modulated beam that arises at the output of the beam splitter 12 in the exemplary embodiment in FIG. 5. This is shown in FIG. 6. The actuating element 7 illustrated comprises a digital micromirror device (DMD) 13 for beam conformation, at which device the laser beam 14 coming from the laser 1 (not illustrated in FIG. 6) is reflected and is then coupled as a laser beam 15 having the schematically indicated beam profile into the fiber 3 (likewise not illustrated in FIG. 6). A computer 16 drives the DMD 13 in such a way that a beam profile that is variable over time is produced in accordance with the required instantaneous beam intensity and the phase profile for the purpose of exciting the two modes, as described above. The DMD 13 must be able to produce both the phase profile and the intensity profile of the beam 15 with a sufficiently high resolution and frame rate (tens of kHz).

The invention claimed is:

1. Method for transmitting laser radiation through an optical waveguide (3), wherein two or more modes of the laser radiation propagating along a propagation direction in the optical waveguide (3) interfere and form a mode interference pattern in the optical waveguide, as a result of which a thermally induced refractive index grating is produced in the optical waveguide (3),
wherein a relative spatial phase shift between the mode interference pattern and the thermally induced refractive index grating is set in the propagation direction such that an energy transfer between the modes of the laser radiation propagating in the optical waveguide takes place in a direction of a fundamental mode of said modes.

2. Method according to claim 1, characterized in that the relative spatial phase shift is constant over time.

3. Method according to claim 1, characterized in that the laser radiation is coupled into the optical waveguide (3) in burst operation, wherein a repetition frequency of bursts in the laser radiation bursts is 50 Hz to 30 kHz.

4. Method according to claim 1, characterized in that the relative spatial phase shift is set by virtue of a propagation of the mode interference pattern along the propagation direction.

5. Method according to claim 4, wherein said mode interference pattern is a travelling mode interference pattern, wherein the laser radiation transmitted through the optical waveguide (3) comprises at least two transverse modes which have different central frequencies and which effect.

6. Method according to claim 5, characterized in that the difference in the central frequencies of the at least two transverse modes is not more than 50 kHz.

7. Method according to claim 4, characterized in that the laser radiation transmitted through the optical waveguide (3) has an intensity and phase profile that is variable over time in a cross-section thereof.

8. Method according to claim 1, characterized in that the optical waveguide (3) is optically pumped, as a result of which the laser radiation is amplified during propagation through the optical waveguide (3).

9. Method according to claim 1, characterized in that the optical waveguide (3) is doped with rare earth ions.

10. Method according to claim 1, characterized in that the laser radiation propagating in the optical waveguide (3) is amplified by inelastic scattering effects.

11. Method according to claim 1, characterized in that the laser radiation propagating in the optical waveguide (3) is amplified by an optical parametric process.

12. Method according to claim 1, characterized in that the laser radiation is coupled into the optical waveguide (3) in burst operation, wherein a repetition frequency of bursts in the radiation is 200 Hz to 10 kHz.

13. Method according to claim 1, characterized in that the laser radiation propagating in the optical waveguide (3) is amplified by Raman or Brillouin scattering.

14. Laser/amplifier combination comprising:
- a laser (1) configured to emit laser radiation, an optical waveguide (3) being an amplifier fiber configured to amplify the laser radiation propagating therein along a propagation direction, wherein two or more modes of the laser radiation propagating in the optical waveguide (3) interfere and form a mode interference pattern in the optical waveguide (3), as a result of which a thermally induced refractive index grating is produced in the optical waveguide (3), and
- an actuating element (7), which produces a predefinable relative spatial phase shift of the mode interference pattern and of the thermally induced refractive index grating in the propagation direction, in such a way that an energy transfer takes place between the modes of the laser radiation propagating in the optical waveguide (3) in a direction of a fundamental mode of said modes.

\* \* \* \* \*